United States Patent
Frolikov

(10) Patent No.: US 10,678,439 B2
(45) Date of Patent: Jun. 9, 2020

(54) OPTIMIZATION OF MEMORY SYSTEMS BASED ON PERFORMANCE GOALS

(71) Applicant: Micron Technology, Inc., Boise, ID (US)

(72) Inventor: Alex Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/943,296

(22) Filed: Apr. 2, 2018

(65) Prior Publication Data
US 2019/0303002 A1 Oct. 3, 2019

(51) Int. Cl.
G06F 3/06 (2006.01)
G06F 9/54 (2006.01)
G06F 11/34 (2006.01)
G06F 9/50 (2006.01)

(52) U.S. Cl.
CPC .......... *G06F 3/061* (2013.01); *G06F 3/0605* (2013.01); *G06F 3/0631* (2013.01); *G06F 3/0679* (2013.01); *G06F 9/505* (2013.01); *G06F 9/54* (2013.01); *G06F 11/3433* (2013.01); *G06F 11/3442* (2013.01)

(58) Field of Classification Search
None
See application file for complete search history.

(56) References Cited

U.S. PATENT DOCUMENTS

| | | | |
|---|---|---|---|
| 9,760,479 B2 * | 9/2017 | Colgrove | ............... G06F 12/023 |
| 2013/0297907 A1 | 11/2013 | Ki et al. | |
| 2014/0108891 A1 | 4/2014 | Strasser et al. | |
| 2014/0344524 A1 | 11/2014 | Shalvi et al. | |
| 2016/0070496 A1 | 3/2016 | Cohen et al. | |
| 2016/0246546 A1 | 8/2016 | Mylly | |
| 2016/0283139 A1* | 9/2016 | Brooker | ................. G06F 3/0619 |
| 2017/0090779 A1* | 3/2017 | Barzik | .................... G06F 3/067 |

OTHER PUBLICATIONS

International Search Report and Written Opinion, PCT/US2019/021683, dated Jun. 20, 2019.

* cited by examiner

*Primary Examiner* — Michael Alsip
(74) *Attorney, Agent, or Firm* — Greenberg Traurig

(57) ABSTRACT

A memory system having a set of media, a set of resources, and a controller configured via firmware to use the set of resources in processing requests from a host system to store data in the media or retrieve data from the media. The memory system has a performance manager that identifies settings for allocations of the resources in the processing of the requests based on a user identified preference and optionally further based on operation statistics of the memory system.

15 Claims, 4 Drawing Sheets

OPTIMIZATION OF MEMORY SYSTEMS BASED ON PERFORMANCE GOALS

FIELD OF THE TECHNOLOGY

At least some embodiments disclosed herein relate to memory systems in general, and more particularly, but not limited to optimization of memory systems based on performance goals.

BACKGROUND

A memory system can be a storage system, such as a solid-state drive (SSD), and can include one or more memory components that store data. For example, a memory system can include memory devices such as non-volatile memory devices and volatile memory devices. In general, a host system can utilize a memory system to store data at the memory devices of the memory system and to retrieve data stored at the memory system.

The memory system can have various resources, such as one or more processors, communication channels, and different types of memory components. Using the resources the processors can execute firmware to perform operations related to data storage requests and/or tasks.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
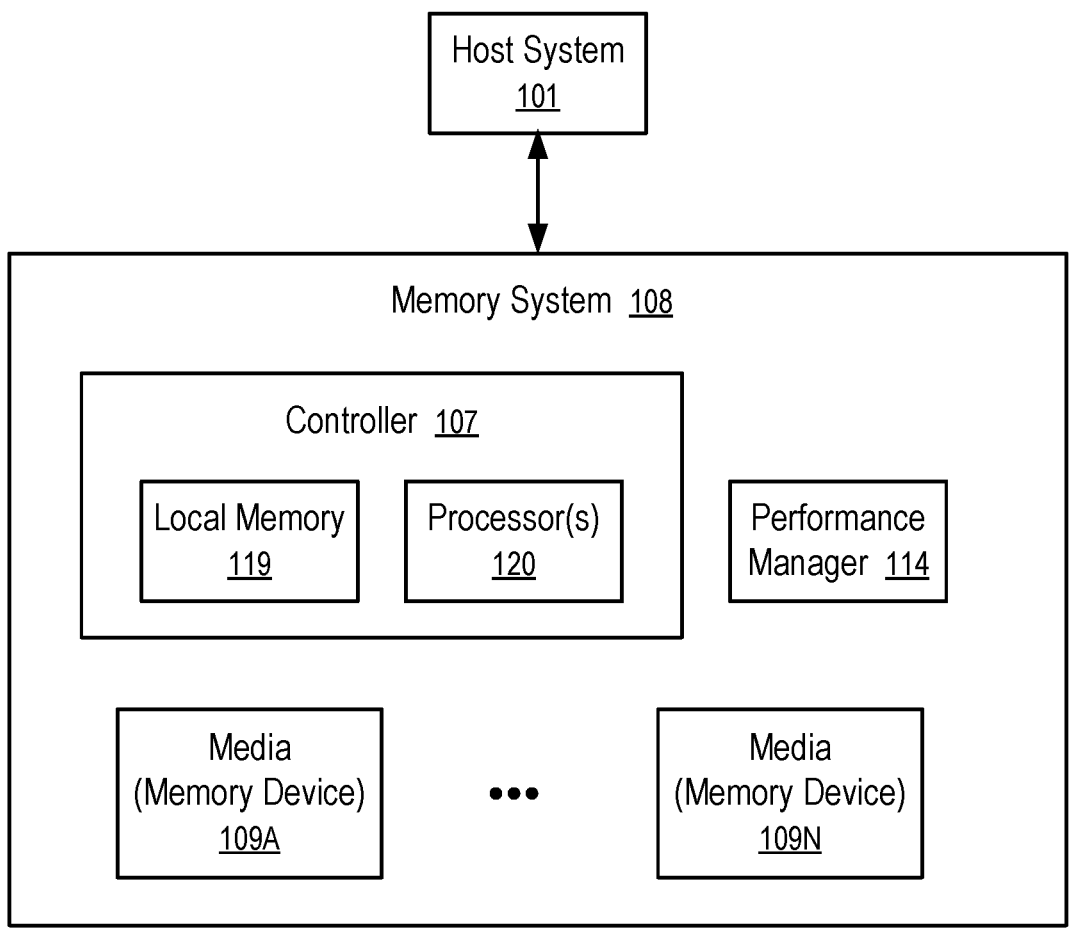
FIG. 1 shows a computing system having a memory system having a performance manager in accordance with some embodiments of the present disclosure.

At least some aspects of the present disclosure are directed to the optimization of a memory system based on different performance goals of interest to different users and/or in response to different patterns of usage of the memory system. An example of a memory system is a storage system, such as a solid-state drive (SSD). In some embodiments, the memory system is a hybrid memory/storage system. In general, a host system can utilize a memory system that includes one or more memory devices. The memory devices can include non-volatile memory devices, such as, for example, memory units formed based on negative-and (NAND) logic gates, memory units formed based on negative-or (NOR) logic gates, etc. The host system can provide write requests to store data at the memory devices of the memory system and can provide read requests to retrieve data stored at the memory system. A memory system can include a controller that manages the memory devices to perform operations such as reading data, writing data, or erasing data and other such operations. A storage system is used as one example of the memory system in the present disclosure.

Operations in a memory system can be optimized for various profiles of operations and/or performance goals, such as read intensity operations, write intensity operations, durability, etc. The resources in the memory system can be allocated and/or utilized differently to optimize the performances of the memory system used under different patterns of operations and/or with different performance priorities.

For example, a configuration profile can be used to specify the settings for the allocation or utilization of resources within the memory system to improve the overall performance of the memory system in a pattern of usage that involves intensive read operations.

For example, a configuration profile can be used to specify the settings for the allocation or utilization of resources within the memory system to improve the overall performance of the memory system in a pattern of usage that involves intensive write operations.

For example, a configuration profile can be used to specify the settings for the allocation or utilization of resources within the memory system to improve the overall performance of the memory system in durability.

A user of the memory system may select a profile from the plurality of available profiles based on the preferences of the user in performance optimization, such as a preference for improved performance in read intensity operations, a preference for improved performance in write intensity operations, or a preference for improved performance in durability. The settings of the selected profile can be used to customize the operations of the memory system.

In some instances, the memory system tracks the statistics of the input/output requests (e.g., read and write commands from its host system) to determine the usage patterns and workloads in a past period of time that may be indicative the usage patterns and workloads of the memory system in a following period of time. The memory system can select and/or generate a configuration profile based on the predicted usage patterns and workloads in the following period of time and/or an indication of the performance priority of the user to re-balance the resource usages within the memory system for performance optimization tailored to the user preference and/or the predicted usage patterns and workloads.

FIG. 1 shows a computing system having a memory system (108) having a performance manager (114) in accordance with some embodiments of the present disclosure.

For example, the performance manager (114) can adjust the way resources of the memory system (108) are used in performing the commands/requests from a host system (101) to optimize certain aspects of performance goals, in accordance with a user preference and/or patterns of the commands/requests from the host system (101).

In general, the memory system (108) can include media, such as memory devices (109A to 109N). The memory devices (109A to 109N) can be volatile memory devices, non-volatile memory (NVM) devices, or a combination of such. In some embodiments, the memory system (108) is a storage system. An example of a storage system is a solid state drive (SSD). In some embodiments, the memory system (108) is a hybrid memory/storage system. In general, the computing system can include a host system (101) that uses the memory system (108). In some implementations, the host system (101) can write data to the memory system (108) and read data from the memory system (108).

The host system (101) can be a computing device such as a desktop computer, laptop computer, network server, mobile device, or such computing device that includes a memory and a processing device. The host system (101) can include or be coupled to the memory system (108) so that the host system (101) can read data from or write data to the memory system (108). The host system (101) can be coupled to the memory system (108) via a physical host interface. As used herein, "coupled to" generally refers to a connection between components, which can be an indirect communicative connection or direct communicative connection (e.g., without intervening components), whether wired or wireless, including connections such as, electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), etc. The physical host interface can be used to transmit data between the host system (101) and the memory system (108). The host system (101) can further utilize an NVM Express (NVMe) interface to access the memory devices (109A to 109N) when the memory system (108) is coupled with the host system (101) by the PCIe interface. The physical host interface can provide an interface for passing control, address, data, and other signals between the memory system (108) and the host system (101).

The memory devices (109A to 109N) can include any combination of the different types of non-volatile memory devices and/or volatile memory devices. An example of non-volatile memory devices includes a negative-and (NAND) type flash memory. Each of the memory devices (109A to 109N) can include one or more arrays of memory cells such as single level cells (SLCs), multi-level cells (MLCs), triple level cells (TLCs), quad-level cells (QLCs), etc. In some implementations, a particular memory device can include both an SLC portion and a MLC (or TLC or QLC) portion of memory cells. Each of the memory cells can store one or more bits of data used by the host system (101). Although non-volatile memory devices such as NAND type flash memory are described, the memory devices (109A to 109N) can be based on any other type of memory such as a volatile memory. In some implementations, the memory devices (109A to 109N) can be, but are not limited to, random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many Flash-based memory, cross point non-volatile memory can perform a write in-place operation, where a non-volatile memory cell can be programmed without the non-volatile memory cell being previously erased. Furthermore, the memory cells of the memory devices (109A to 109N) can be grouped as memory pages or data blocks that can refer to a unit of the memory device used to store data.

The controller (107) can communicate with the memory devices (109A to 109N) to perform operations such as reading data, writing data, or erasing data at the memory devices (109A to 109N) and other such operations. The controller (107) can include hardware such as one or more integrated circuits and/or discrete components, a buffer memory, or a combination thereof. The controller (107) can be a microcontroller, special purpose logic circuitry (e.g., a field programmable gate array (FPGA), an application specific integrated circuit (ASIC), etc.), or another suitable processor. The controller (107) can include one or more processors (processing devices) (120) configured to execute instructions stored in local memory (119).

In the illustrated example, the local memory (119) of the controller (107) includes an embedded memory configured to store instructions for performing various processes, operations, logic flows, and routines that control operation of the memory system (108), including handling communications between the memory system (108) and the host system (101), and the functions of the performance manager (114), which is described in greater detail below. In some embodiments, the local memory (119) can include memory for the implementation of the performance manager (114) and/or memory registers storing, e.g., memory pointers, fetched data, etc. The local memory (119) can include read-only memory (ROM) for storing micro-code.

While the example memory system (108) in FIG. 1 has been illustrated as including the controller (107), in another embodiment of the present disclosure, a memory system (108) may not include a controller (107), and may instead rely upon external control (e.g., provided by an external host, or by a processor or controller separate from the memory system).

In general, the controller (107) can receive commands or operations from the host system (101) and can convert the commands or operations into instructions or appropriate commands to achieve the desired access to the memory devices (109A to 109N). The controller (107) can be responsible for other operations such as wear leveling operations, garbage collection operations, error detection and error-correcting code (ECC) operations, encryption operations, caching operations, and address translations between a logical block address and a physical block address that are associated with the memory devices (109A to 109N). The controller (107) can further include host interface circuitry to communicate with the host system (101) via the physical host interface. The host interface circuitry can convert the commands received from the host system into command instructions to access the memory devices (109A to 109N) as well as convert responses associated with the memory devices (109A to 109N) into information for the host system (101).

The memory system (108) can also include additional circuitry or components that are not illustrated. In some implementations, the memory system (108) can include a cache or buffer (e.g., DRAM) and address circuitry (e.g., a row decoder and a column decoder) that can receive an address from the controller (107) and decode the address to access the memory devices (109A to 109N).

In one example, the host system (101) has one or more connectors to provide the memory system (108) with power and/or communicate with the memory system (108) via a communication channel and a predetermined protocol; and the memory system (108) has one or more connectors to receive the power, data and commands from the host system (101). For example, the connection between connector on the host system (101) and connector on memory system (108) may utilize a PCIe bus or a SATA bus.

Figure 2:
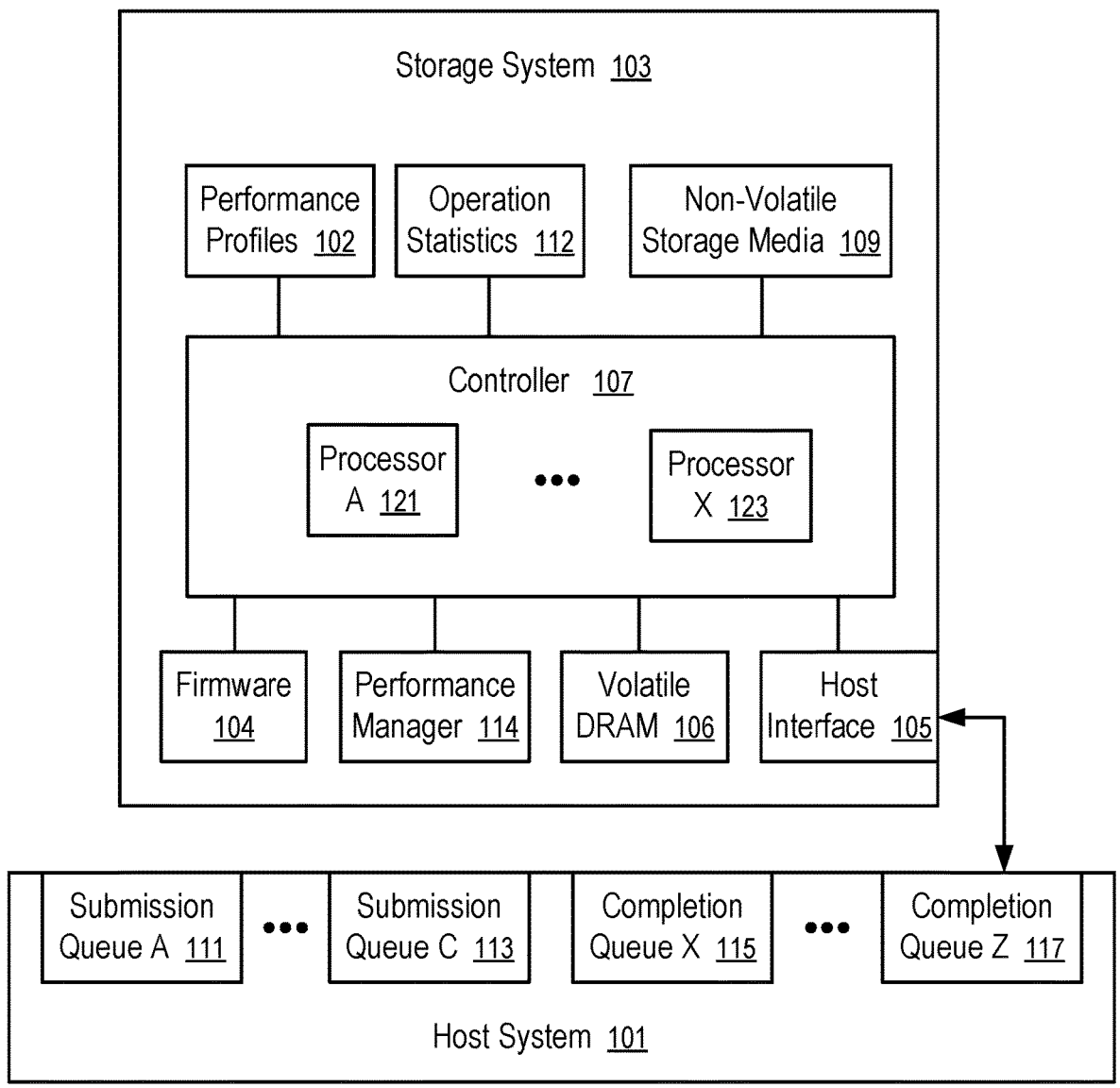
FIG. 2 shows a storage system configured to balance performance needs based on performance profiles and/or operation statistics.

FIG. 2 shows a storage system (103) configured to balance performance needs based on performance profiles and/or operation statistics. For example, the storage system (103) of FIG. 2 can be used as an example of the memory system (108) in the computing system of FIG. 1.

The storage system (103) of FIG. 2 has various hardware resources that can be used to process the requests/commands from the host system (101).

For example, the hardware resources of the storage system (103) include processors (121, . . . , 123) of a controller (107) of the storage system (103). The processors (121, . . . , 123) can be allocated to perform different tasks in the processing of a request or command from the host system (101). Different ways to allocate the processors (121, . . . , 123) to different tasks can have different impacts in the performance levels of the storage system (103) in completing different types of requests or commands (e.g., improving a performance level in completing certain types of requests or commands while reducing a performance level in completing other types of requests or commands).

For example, the hardware resources of the storage system (103) include volatile memory (106). Different portions of the volatile memory (106) of different sizes can be allocated to different tasks in the processing of request or command from the host system (101). Different ways to partition the volatile memory (106) for allocation to different tasks can have different impacts in the performance levels of the storage system (103) in completing different types of requests or commands (e.g., improving a performance level in completing certain types of requests or commands while reducing a performance level in completing other types of requests or commands).

Further examples of hardware resources of the storage system (103) that can be allocated in different ways to impart different impacts on different performance goals of the storage system (103) include inter-process communication channels, registers, data and/or control signal buses, etc.

In some instances, non-volatile storage media (109) has a limited budget for rewriting data into a same memory unit in the non-volatile storage media (109). After the write budget is consumed, writing new data in the memory unit may not allow reliable retrieval of the data from the memory unit. The controller (107) of the storage system is programmed via the firmware (104) to perform operations to reduce writes in the non-volatile storage media (109) and/or to spread the writes in different memory units. Allocating different amount of resources (e.g., buffer memory and/or time slots) for such operations can have different impacts on the amount of reduction of writes achieved through the controller (107) performing such operations and thus result in different performance levels in the durability of the storage system (103).

The storage system (103) stores a set of performance profiles (102). Each of the performance profile (102) specifies a set of parameters that identify the allocations of resources of the storage system (103) in performing various tasks/operations within the storage system (103). When used by the controller (107) executing the firmware (104), the set of parameters in a corresponding performance profile (102) optimizes a particular performance goal, such as the input/output performance for a typical read intensive usage, the input/output performance for a typical write intensive usage, the durability of the storage system, etc.

The performance manager (114) allows the selection of one of the performance goals (e.g., read intensity mode, write intensity mode, durability mode) as a preference and uses one of the predefined performance profiles (102) corresponding to the selected performance goal to configure the resource usage in the operations of the controller (107) running the firmware (104).

For example, the host system (101) may present a user interface that allows a user of the host system (101) to select a performance optimization goal for the storage system (103). For example, a user may select to optimize the storage system (103) for read intensity usages, for write intensity usages, for durability, etc. The user selection is communicated from the host system (101) to the storage system (103) through a host interface (105), which causes the storage system (103) to use one of the performance profiles (102) corresponding to the user selection to configure the controller (107) running the firmware (104).

Optionally, the storage system (103) stores the user selection (e.g., in a predetermined location in the non-volatile storage media (109)) such that when the storage system (103) is restarted/rebooted, one of the performance profiles (102) corresponding to the user selection is used to configure the controller (107) running the firmware (104) in balancing the resource usages to optimize the performance in the user selected performance goal.

Optionally, the storage system (103) stores a performance profile (102) corresponds to the user selected performance goal and may not store other performance files of non-selected performance goals. The stored performance profile (102) may be received from the host system (101) in response to the user selection of a performance goal. The performance profile (102) can be received as a firmware update and/or via an administrative command for the customization of the storage system (103).

In some instances, the user may specify different weights for the different performance goals. For example, the user may specify a first weight for read intensity usages, a second weight for write intensity usages, a third weight for durability, etc. The host system (101) and/or the performance manager (114) combines the different performance profiles for the respective performance goals according to the user specified weights to generate a customized performance profile (102) based on predetermined rules. Thus, the user may specify a customized performance goal in the form of a combination of a set of predefined performance goals, instead of being restricted to selecting one from a predetermined set of performance goals.

The set of weights can be stored in the non-volatile storage media (109) to generate a customized performance profile (102) for application during the start or boot of the storage system (103). Alternatively, the host system (101) (or a remote server) generates the customized performance profile (102) according to the set of weights and downloads the customized performance profile (102) into the storage system (103).

In some instances, the performance manager (114) tracks the operations performed by the storage system (103) in response to the requests/commands from the host system (101) to generate the operation statistics (112). For example, the operation statistics (112) can identify the read intensity of past operations during a period of time, the write intensity of past operations during a period of time, the usage rate of the storage system (103), etc. The operation statistics (112) can be used to customize the weights for the combination of the performance profiles (102) in generating a customized performance profile (102) for the storage system (103) during a period of time that has similar usage patterns.

For example, a weight for the read intensity mode can be proportional to the measurement of the read intensity of past operations during the period of time; a weight for the write intensity mode can be proportional to the measurement of the write intensity of past operations during the period of time; and a weight for the durability mode can be proportional to the measurement of the usage rate of past operations during the period of time.

In some instances, the weights for the different modes computed from the operation statistics (112) are combined with the weights for the respective modes specified by the user of the system. For examples, the weights for the different modes computed from the operation statistics (112) can be multiplied by respective weights specified by the user for the respective modes to compute the weights used for combining the performance profiles (102) of the respective modes.

In general, the host system (101) can use message queues to submit requests/commands, including the user preferences, weights, and/or the performance profiles (102), to the storage system (103).

For example, a submission queue (e.g., 111, ..., or 113) can be used by the host system (101) to submit requests to the storage system (103); and a completion queue (e.g., 115, ..., or 117) can be used by the host system (101) to receive responses from the storage system (103).

For example, a version of NVMe (e.g., Non-Volatile Memory Host Controller Interface Specification 1.2) specifies the use of a circular buffer with a fixed slot size for a submission queue (e.g., 111, ..., or 113) or a completion queue (e.g., 115, ..., or 117).

The NVMe further specifies different types of message queues for the processing of different types of commands. For example, input/output (I/O) commands are limited to be submitted via I/O submission queues; and admin commands are limited to be submitted via admin submission queues. Examples of I/O commands include commands to read data from the storage system (103), commands to write data into the storage system (103), commands to compare data in the storage system (103), etc. Examples of admin commands include commands to manage namespaces, commands to attach namespaces, commands to create I/O submission or completion queues, commands to delete I/O submission or completion queues, commands for firmware management, etc. The NVMe allows multiple I/O submission queues to share an I/O completion queue by explicitly identifying the I/O completion queue in the request for the creation of each of the I/O submission queues.

The NVMe requires that the storage system (103) fetch the commands/requests from a submission queue (111, ..., or 113) according to the order in which the commands are placed in the submission queue (111, ..., or 113). However, the NVMe allows the controller (107) to execute the fetched commands in any order.

Figure 3:
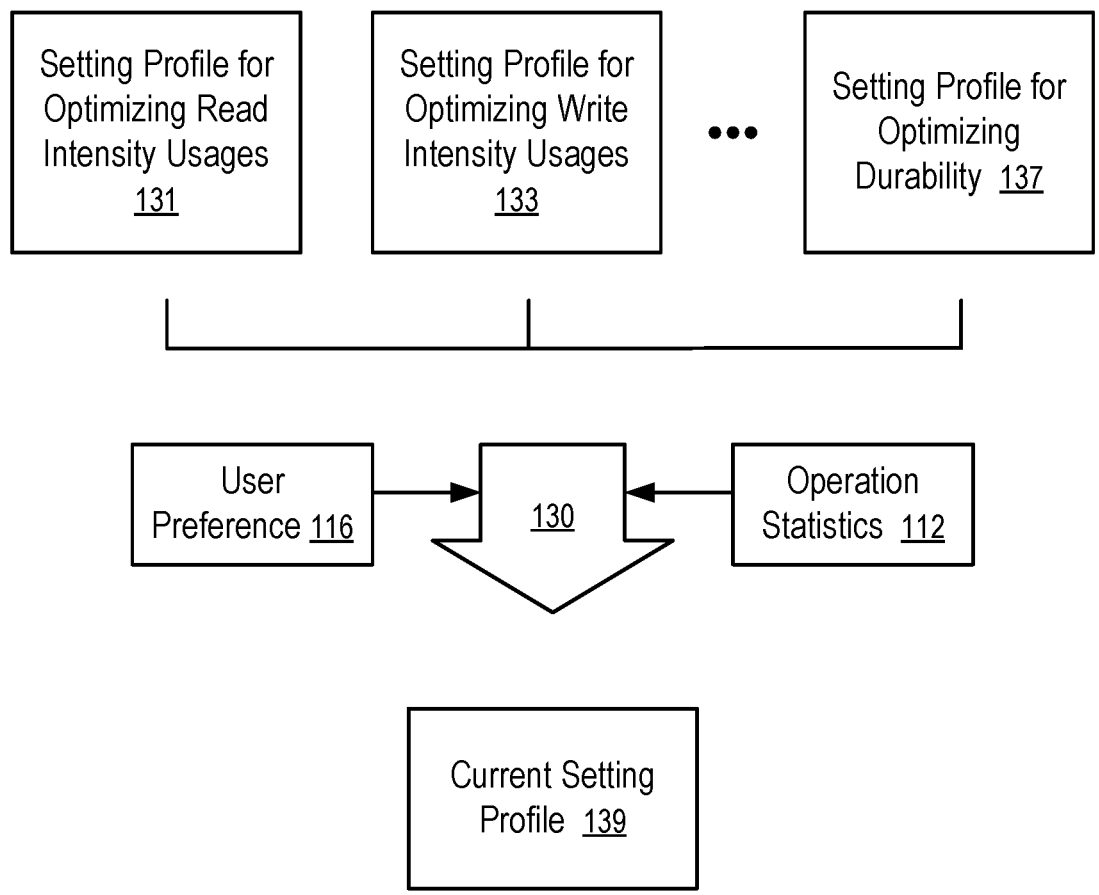
FIG. 3 illustrates an example of determine a current setting profile for optimization of a customized performance goal.

FIG. 3 illustrates an example of determine a current setting profile for optimization of a customized performance goal. For example, the technique of FIG. 3 can be implemented via the performance manager (114) of FIG. 1 and/or FIG. 2.

In FIG. 3, a set of setting profiles (131, 133, ..., 137) are pre-designed for performance optimization for a plurality of predefined usage models.

For example, the setting profile (131) specifies settings of resource allocations/usages in the storage system (103) to optimize performance for read intensity usages.

For example, the setting profile (133) specifies settings of resource allocations/usages in the storage system (103) to optimize performance for write intensity usages.

For example, the setting profile (137) specifies settings of resource allocations/usages in the storage system (103) to optimize durability of the non-volatile storage media (109) of the storage system (103).

For example, the setting profiles (131, 133, ..., 137) of FIG. 3 can be used as the performance profiles (102) in the storage system (103) of FIG. 2.

Based on a user preference (116) and/or operation statistics (112), a current setting profile (139) is identified (130) from the setting profiles (131, 133, ..., 137).

For example, when the operation statistics (112) is not available, the user preference (116) may select one of the setting profiles (131, 133, ..., 137) as the current setting profile (139).

For example, when the operation statistics (112) is not available, the user preference (116) may specify a weight for each of the setting profiles (131, 133, ..., 137); and the set of weights of the user preference (116) is applied to the set of setting profiles (131, 133, ..., 137) to generate (130) the current setting profile (139).

For example, when the user preference (116) is not available, the operation statistics (112) can be used to derive a set of weights for the set of setting profiles (131, 133, ..., 137); and the set of weights generated from the operation statistics (112) is applied to the set of setting profiles (131, 133, ..., 137) to generate (130) the current setting profile (139).

For example, when the user preference (116) specifies a set of weights for the set of setting profiles (131, 133, ..., 137) respectively and a set of weights is generated from the operation statistics (112) for a period of time that is indicative of the operation characteristics of a following period of time, the set of weights of the user preference (116) and the set of weights derived from the operation statistics (112) can be both applied to the set of setting profiles (131, 133, ..., 137) to generate (130) the current setting profile (139) that is customized for the following period of time.

Figure 4:
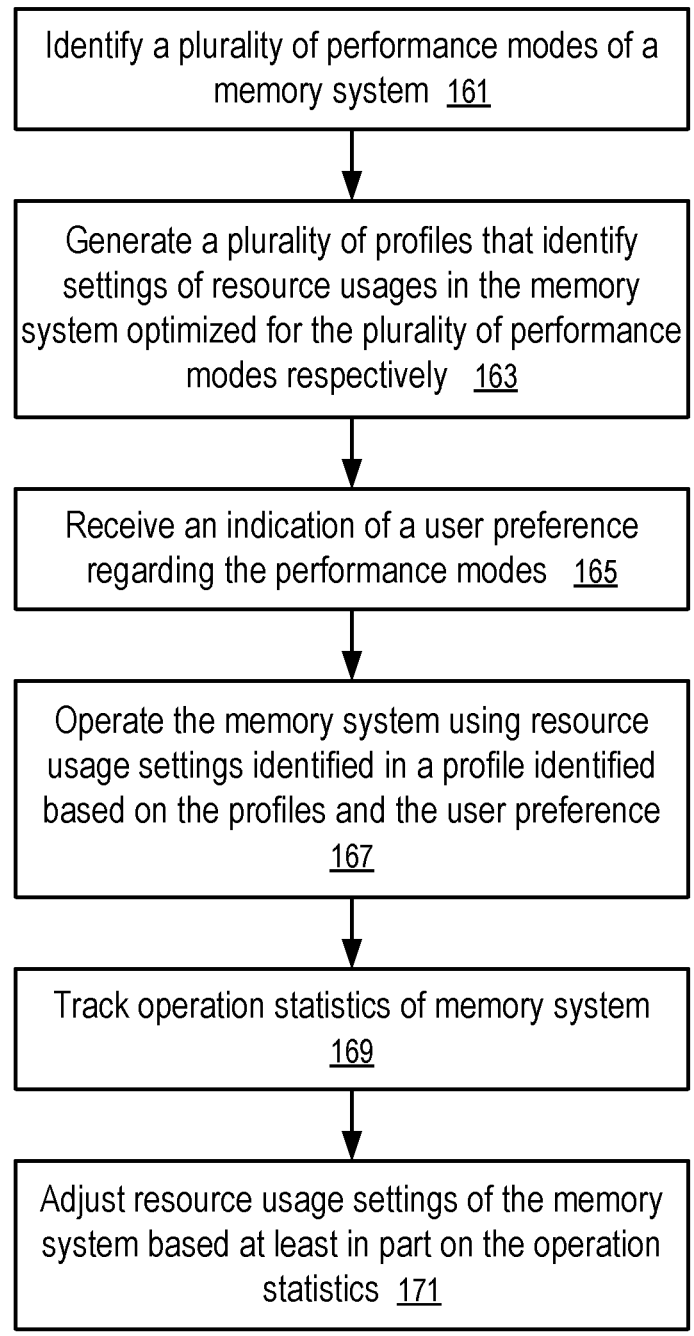
FIG. 4 shows a method to optimize a memory system based on performance goals.

FIG. 4 shows a method to optimize a memory system based on performance goals. For example, the method of FIG. 4 can be used in the memory system (108) of FIG. 1 in general and in the storage system (103) of FIG. 2 as an example, to implement the technique of FIG. 3.

The method of FIG. 4 includes: identifying (161) a plurality of performance modes of a memory system; generating (163) a plurality of profiles (102, or 131, 133, ..., 137) that identify settings of resource usages in the memory system (108 or 103) optimized for the plurality of performance modes respectively; receiving (165) an indication of a user preference (116) regarding the performance modes; operating (167) the memory system (108 or 103) using resource usage settings identified in a profile (139) identified based on the profiles (102, or 131, 133, ..., 137) and the user preference (116); tracking (169) operation statistics (112) of memory system (108 or 103); and adjusting (171) resource usage settings of the memory system based at least in part on the operation statistics (112).

For example, a memory system (e.g., 108 or 103) can have a set of media (e.g., 109A to 109N, or 109), a set of resources; and a controller (107) configured via firmware (104) to use the set of resources in processing requests from a host system (101) to store data in the media (e.g., 109A to 109N, or 109) or retrieve data from the media (e.g., 109A to 109N, or 109). The memory system (e.g., 108 or 103) has a performance manager (114) that identifies settings (139) for allocations of the resources in the processing of the requests based at least in part on a user identified preference (116). The performance manager (114) can be implemented via the controller (107) executing a portion of the firmware (104) and/or a special purpose circuit.

For example, the set of media (e.g., 109A to 109N, or 109) can include a flash memory; and the memory system (e.g., 108 or 103) can be a solid state drive (SSD).

For example, the user identified preference (116) can select a performance goal from a plurality of predefined performance goals that have a plurality of setting profiles (131, 133, . . . , 137); and the settings (139) for the allocations of the resources are specified in a profile (139) selected from the plurality of setting profiles (131, 133, . . . , 137) according to the performance goal selected by the user identified preference (116).

For example, the user identified preference (116) can specify a plurality of weights for a plurality of predefined performance goals that have a plurality of setting profiles (131, 133, . . . , 137); and the settings (139) for the allocations of the resources are computed by applying the plurality of weights on the plurality of setting profiles (131, 133, . . . , 137) respectively. In some instances, at least two of the plurality of setting profiles (131, 133, . . . , 137) have non-zero weights.

For example, the memory system (e.g., 108 or 103) stores a plurality of setting profiles (102, or 131 to 137) for a plurality of predefined performance goals respectively; and the settings (139) for the allocations of the resources are based on the plurality of setting profiles (102, or 131 to 137).

Examples of the plurality of predefined performance goals include at least one of: optimization for read intensive usage of the memory system (e.g., 108 or 103) (e.g., 108 or 103); optimization for write intensities usage of the memory system (e.g., 108 or 103); and optimization for durability of the memory system (e.g., 108 or 103).

Examples of the set of resources include at least one of: volatile memory, registers, communication buses, inter-process communication channels, and processors (120, or 121 to 123) or running processes in the controller (107).

For example, the controller (107) of the memory system (e.g., 108 or 103) can include a plurality processors (120, or 121 to 123) that run a plurality of processes; each of the processes performs one of a plurality of tasks in the memory system (e.g., 108 or 103); and the settings (139) balance resource allocations among the tasks for a performance goal individualized based on the user preference (116) and/or the actual or predicted usages of the memory system (e.g., 108 or 103) in serving the requests/commands from the host system (101).

For example, the performance manager (114) can determine operation statistics (112) of the memory system (e.g., 108 or 103) and identify (130) the settings (139) for allocations of the resources based on the user preference (116) and the operation statistics (112).

For example, the operation statistics (112) can be used to compute weights for the plurality of predefined performance goals; and the weights can be modified via the user preference (116) before being applied on the setting profiles (131 to 137) of the predefined performance goals to generate a customized/individualized setting profile (139).

For example, the performance manager (114) computes a plurality of first weights for the plurality of predefined performance goals respectively based on the operation statistics (112); the user identified preference (116) specifies a plurality of second weights for the plurality of predefined performance goals respectively; and the plurality of first weights and the plurality of second weights are applied on the plurality of setting profiles to determine the settings (139) for the allocations of the resources.

In some instances, the computation of the customized and/or individualized setting profile (139) is performed on the host system (101). The setting profile (139) is downloaded to the memory system (e.g., 108 or 103) during a firmware update or customization operation.

In some instances, the host system (101) can track the operation statistics (112) and/or obtain the user preference (116) independent from and/or without involving the memory system (e.g., 108 or 103).

The storage system (103) of FIG. 2 can be attached to the host system (101) in FIG. 1 as an implementation of the memory system (108). A communication channel between the host system (101) and the memory system (108) in general and the storage system (103) in particular allows the host system (101) to send data requests and/or other commands that trigger certain operations of the controller (107) on the media (e.g., 109A to 109N, 109), such as data write operations, data read operations, data erasure operations. A host interface (105) implements the communication protocols of the communication channel.

In some implementations, the communication channel between the host system (101) and the memory system (108) or the storage system (103) includes a bus for computer peripheral devices, such as a PCIe bus, a SATA bus, a USB bus.

In some implementations, the communication channel between the host system (101) and the storage system (103) includes a computer network, such as a local area network, a wireless local area network, a wireless personal area network, a cellular communications network, a broadband high-speed always-connected wireless communication connection (e.g., a current or future generation of mobile network link); and the host system (101) and the storage system (103) can be configured to communicate with each other using data storage management and usage commands similar to those in NVMe protocol.

The controller (107) of the storage system (103) can run firmware (104) to perform operations responsive to the communications from the host system (101). Firmware in general is a type of computer program that provides control, monitoring and data manipulation of engineered computing devices.

The storage system (103) can have non-volatile storage media (109). Examples of non-volatile storage media (109) include memory cells formed in an integrated circuit and magnetic material coated on rigid disks. Non-volatile storage media (109) can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3D XPoint memory). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors (121, . . . , 123), each having its own in-processor cache memory.

Optionally, the controller (107) performs data intensive, in-memory processing using data and/or instructions organized in the storage system (103). For example, in response to a request from a host system (101), the controller (107) performs a real time analysis of a set of data stored in the storage system (103) and communicates a reduced data set to the host system (101) as a response. For example, in some applications, the storage system (103) is connected to real time sensors to store sensor inputs; and the processors (120, 121, . . . , 123) of the controller (107) are configured to perform machine learning and/or pattern recognition based on the sensor inputs to support an artificial intelligence (AI) system that is implemented at least in part via the storage system (103) and/or the host system (101).

In some implementations, the processors (120, 121, . . . , 123) of the controller (107) are integrated with memory (e.g., 119, 109A, . . . , 109N, 106, 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate and decreases latency and power usage.

The storage system (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

Some embodiments involving the operation of the controller (107) can be implemented using computer instructions executed by the controller (107), such as the firmware (104) of the controller (107). In some instances, hardware circuits can be used to implement at least some of the functions. The firmware (104) can be initially stored in the non-volatile storage media (109), or another non-volatile device, and loaded into the volatile DRAM (106) and/or the in-processor cache memory for execution by the controller (107).

A non-transitory computer storage medium can be used to store instructions of the firmware (104) of the memory system (108) in general and the storage system (103) in particular. When the instructions are executed by the controller (107) of the memory system (108) or the storage system (103), the instructions cause the controller (107) to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or micro-controller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A memory system, comprising:
a set of media;
a set of resources;
a controller configured to use the set of resources in processing requests from a host system to store data in the media or retrieve data from the media; and
a performance manager configured to:
load a set of setting profiles, the setting profiles comprising a set of default performance optimization settings for a plurality of predefined usage models,
receive a user identified preference, wherein the user identified preference selects a performance goal from a plurality of predefined performance goals associated with the setting profiles,
load a set of preferences derived from operation statistics of the memory system,
combine the user identified preference and the set of preferences derived from operation statistics to generate combined preferences, and
use the combined preferences to select a current setting profile, the current setting profile used to operate the controller.

2. The memory system of claim 1, wherein the set of media includes a flash memory.

3. The memory system of claim 2, wherein the memory system is a solid state drive.

4. The memory system of claim 1, wherein the user identified preference specifies a plurality of weights for a plurality of predefined performance goals that have a plurality of setting profiles; and the settings for the allocations of the resources are computed by applying the plurality of weights on the plurality of setting profiles respectively.

5. The memory system of claim 1, wherein the plurality of predefined performance goals include at least one of:
optimization for read intensive usage of the memory system;
optimization for write intensities usage of the memory system; and
optimization for durability of the memory system.

6. The memory system of claim 1, wherein the set of resources includes at least one of: volatile memory, registers, communication buses, and inter-process communication channels.

7. The memory system of claim 1, wherein the controller includes a plurality processors running a plurality of processes; each of the processes performs one of a plurality of tasks in the memory system; and the settings balance resource allocations among the tasks.

8. A method, comprising:
providing a set of media and a set of resources in a memory system;
receiving, in the memory system, a user identified preference;
loading a set of setting profiles, the setting profiles comprising a set of default performance optimization settings for a plurality of predefined usage models;
loading the user identified preference, the user identified preference selecting a performance goal from a plurality of predefined performance goals associated with the setting profiles;
loading a set of preferences derived from operation statistics of the memory system;
combining the user identified preference and the set of preferences derived from operation statistics to generate combined preferences;
using the combined preferences to select a current setting profile; and
processing, by a controller running firmware of the memory system, requests from a host system to store data in the media or retrieve data from the media, using the resources allocated according to the current setting profile.

9. The method of claim 8, wherein the set of media includes a flash memory; the memory system is a solid state drive; and the set of resources includes at least one of: volatile memory, registers, communication buses, and inter-process communication channels.

10. The method of claim 8, wherein the controller includes a plurality processors running a plurality of processes; each of the processes perforins one of a plurality of tasks in the memory system; and the settings balance resource allocations among the tasks.

11. The method of claim 8, wherein the plurality of predefined performance goals include at least one of:
optimization for read intensive usage of the memory system;
optimization for write intensive usage of the memory system; and
optimization for durability of the memory system.

12. The method of claim 8, wherein the user identified preference selects a performance goal from the plurality of predefined performance goals; and the method further includes:
selecting a profile from the plurality of setting profiles according to the performance goal selected by the user identified preference;
wherein the settings for the allocations of the resources are identified from the profile selected according to the performance goal.

13. The method of claim 8, wherein the user identified preference specifies a plurality of weights for the plurality of predefined performance goals; and the method further includes:
applying the plurality of weights on the plurality of setting profiles respectively to compute the settings for the allocations of the resources.

14. A non-transitory computer storage medium storing instructions which, when executed by a memory system having a set of media and a set of resources and a controller, cause the memory system to perform a method, the method comprising:
- determining operation statistics of the memory system;
- loading a set of setting profiles, the setting profiles comprising a set of default performance optimization settings for a plurality of predefined usage models;
- receiving, in the memory system, a user identified preference,
- wherein the user identified preference selects a performance goal from a plurality of predefined performance goals associated with the setting profiles;
- loading a set of preferences derived from operation statistics of the memory system;
- combining the user identified preference and the set of preferences derived from operation statistics to generate combined preferences;
- using the combined preferences to select a current setting profile; and
- processing, by the memory system, requests from a host system to store data in the media or retrieve data from the media, using the resources allocated according to the current setting profile.

15. The non-transitory computer storage medium of claim 14, wherein the method further comprises:
- storing a plurality of setting profiles for a plurality of predefined performance goals respectively; and
- computing a plurality of first weights for the plurality of predefined performance goals respectively based on the operation statistics;
- wherein the user identified preference specifies a plurality of second weights for the plurality of predefined performance goals respectively; and
- wherein the plurality of first weights and the plurality of second weights are applied on the plurality of setting profiles to determine the settings for the allocations of the resources.

* * * * *